Figure 1:
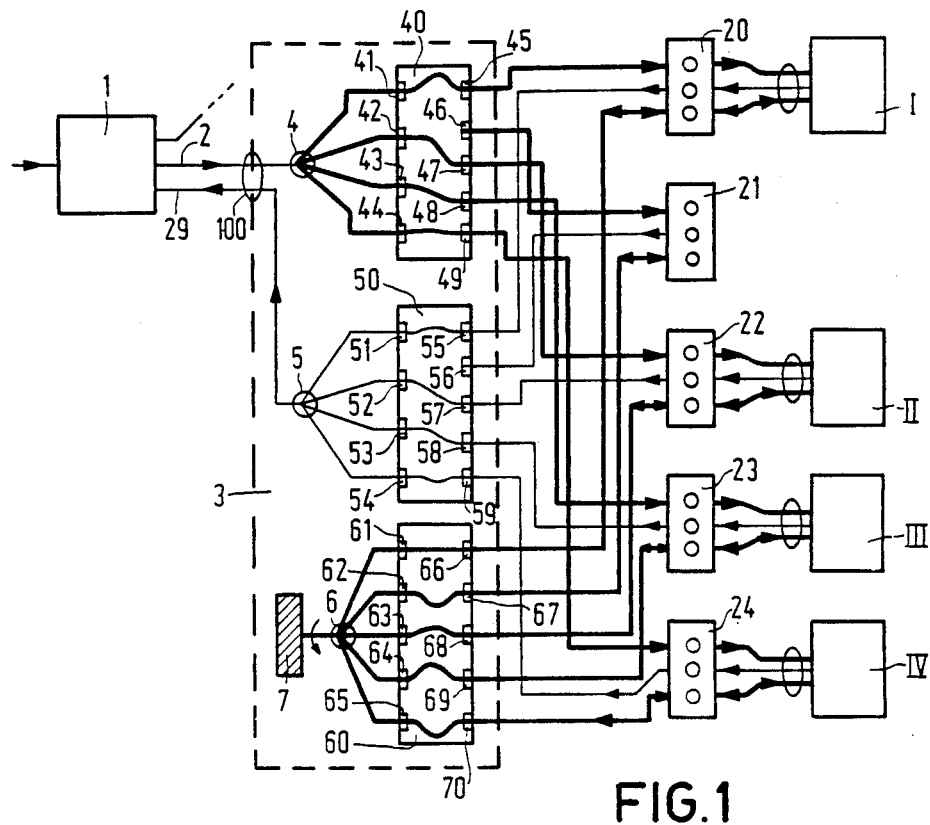

United States Patent [19]

Khoe

[11] Patent Number: 4,528,695
[45] Date of Patent: Jul. 9, 1985

[54] DISTRIBUTION SYSTEM FOR A LOCAL FIBRE NETWORK

[75] Inventor: Giok D. Khoe, Eindhoven, Netherlands

[73] Assignee: U.S. Philips Corporation, New York, N.Y.

[21] Appl. No.: 553,454

[22] Filed: Nov. 18, 1983

[30] Foreign Application Priority Data

Dec. 7, 1982 [NL] Netherlands ............ 8204722

[51] Int. Cl.³ .................. H04B 9/00
[52] U.S. Cl. .................. 455/612; 350/96.15; 350/96.16
[58] Field of Search .................. 455/610, 612; 350/96.15, 96.16, 96.20

[56] References Cited

U.S. PATENT DOCUMENTS 4,464,012 8/1984 Khoe et al. ............ 455/612

OTHER PUBLICATIONS

Krahn-Optical Cable Network-Conf: Cherry Hill, N.J., (Nov. 18-20, 1980) Proceedings of the 29th Internat. Wire & Cable Symposium, pp. 418-423.

Primary Examiner—Joseph A. Orsino, Jr.
Attorney, Agent, or Firm—Thomas A. Briody; William J. Streeter

[57] ABSTRACT

A transparent optical distribution system which is tolerant to system variations and extension in future, such as the choice of analogue or digital signals, bandwidth, bit rate, the number of services and connections per subscriber comprises a common terminal unit (3) provided at each subscriber's premises. The common terminal unit (3) comprises an input (100) connected via a power splitter (4) to a distribution box (40) which has a plurality of outputs (45-49) each connected to a respective wall socket (20-24). A second distribution box (50) has a plurality of inputs (55-59) to which the wall sockets (20-24) are connected and outputs (51-54) which are connected via a power splitter (5) to the input (100) of the terminal unit (3). A third distribution box (60) has a plurality of terminals (66-70) connected to the wall sockets (20-24) and a further plurality of terminals (61-65) connected to a power splitter 6 whose output is connected to a mirror (7). Intercommunication between terminals (I-IV) takes place via the third distribution box (60) and is independent of incoming and outgoing signals.

5 Claims, 4 Drawing Figures

DISTRIBUTION SYSTEM FOR A LOCAL FIBRE NETWORK

The invention relates to a distribution system for a local fibre network comprising a distribution unit, which is connected through optical transmission fibres to a plurality of subscriber's premises, each subscriber's premises being provided with a common terminal unit which has at least one input and several outputs, the input being connected through a first power splitter to a first distribution box, whose outputs are connected through a first set of optical fibres to respective optical sockets, the input fibre being connected through a second power splitter to a second distribution box, whose inputs are connected through a second set of optical fibres to the respective sockets, the numerical aperture on the optical axis and the core diameter of the first set of optical fibres and the optical fibres present between the inputs of the first distribution box and the power splitter being larger than the numerical aperture and the core diameter of the remaining optical fibres of the distribution system.

It should be noted that the term "local network" is to be understood to include all the transmission paths and apparatus between a central unit and the subscriber's socket. A distribution system of the afore-mentioned kind has been described, for example, in Dutch Patent Application No. 8,104,104. The local network described therein is completely transparent. By completely transparent is meant that, when a new waveband or a new service is added, no modifications need be provided in the common terminal units of the local network. It is further possible to realize in a very simple manner an intercommunication system at the relevant subscriber's premises. Examples of intercommunication are transmission of signals from a videorecorder in the living-room to a television set in a bedroom, security systems, a baby's room monitoring system and the connection of various wall sockets with a domestic computer.

The intercommunication system described in the said Dutch Patent Application is included in the part of the distribution system which is also used for the return transmission (upstream) from the subscriber's premises to the central unit. This results in only a limited wavelength range being available for use for the intercommunication. Only those wave-lengths which are not used already used for the return transmission can be used for intercommunication. These are, for example, the wave-lengths <750 nm, for which wave-lengths lasers can be manufactured only with great difficulty. A further limitation arises from the fact that the numerical aperture on the optical axis and the core diameter of the second set of optical fibres should not be larger than the numerical aperture on the optical axis and the core diameter of the fibres used between the central unit and the subscriber's premises. This renders the use of inexpensive connection techniques and components more difficult.

The invention has for its object to midigate the afore-mentioned limitations.

The invention provides a distribution system as set forth in the opening paragraph, characterized in that the common terminal unit comprises a third distribution box, whose outputs are connected through a third set of one or more fibres to the respective sockets, the inputs of the third distribution box being coupled through a third power splitter to an optical filter. This enables the intercommunication part of the domestic network and the remaining part of the domestic network to be decoupled from each other. As a result, all the existing lasers, detectors and fibres can be used without any limitation for intercommunication purposes.

The numerical aperture on the optical axis and the core diameter of the third set of fibres and the fibres present between the inputs of the third distribution box and the optical filter are larger than the numerical aperture on the optical axis and the core diameter of the second set of fibres. Thus, higher coupling efficiencies between lasers and fibres can be realized. On the other hand, plugs of lower quality can now be used for the thick fibres, which results in a reduction of the cost of the domestic network.

Furthermore, broadband signals can now be processed in the intercommunication part of the domestic network, such as, for example, multiplexed digital television signals, because all the existing lasers can now be used for intercommunication.

Figure 2:
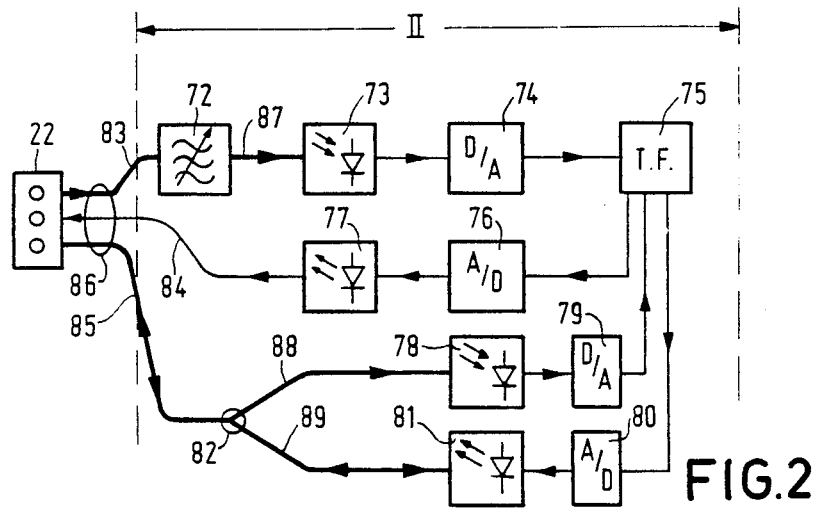
Figure 3:
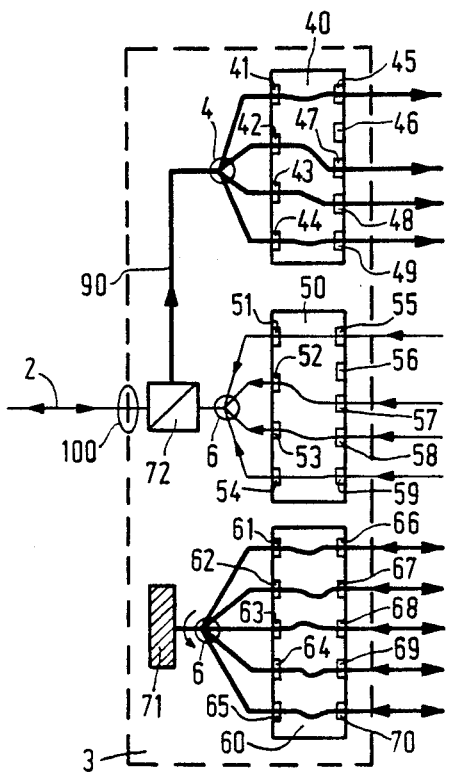
Figure 4:
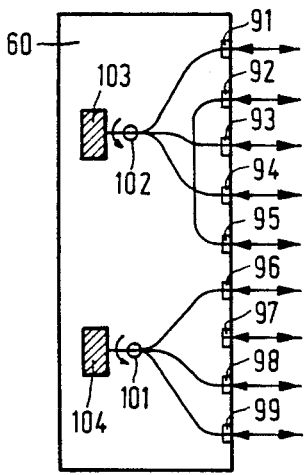

Embodiments of the invention will now be described, by way of example, with reference to the accompanying drawings, in which:

FIG. 1 shows a first embodiment of a distribution system according to the invention, FIG. 2 shows a possible construction of a terminal for use in a distribution system according to the invention, FIG. 3 shows a second embodiment of a distribution system according to the invention, and FIG. 4 shows an alternative embodiment of the third distribution box of FIGS. 1 and 3.

In the embodiment shown in FIG. 1, reference numeral 1 designates a distribution unit of a local optical fibre network. The input 100 of a common terminal unit 3 is connected through an optical fibre 2, for example, a monomode fibre, for forward signals from the distribution unit 1. The input 100 of the common terminal unit 3 is further connected through an optical fibre 29, for example, a graded-index fibre, for return signals to the distribution unit 1. The optical fibre 2 is connected through a first power splitter 4 to inputs 41, ... 44 of a first distribution box 40. The inputs 41,42,43 and 44 of the distribution box 40 are internally through-connected to respective outputs 45, 47, 48 and 49 of the distribution box 40. The outputs 45, ... 49 are connected through a first set of optical fibres to respective sockets 20, ... 24 which may be on a wall or any other suitable surface within the subscriber's premises. Terminals I,II,III and IV are connected to the respective sockets 20, 22, 23, 24 hereinafter referred to as wall sockets. The optical fibre 29 is connected through a second power splitter 5 to the outputs 51, ... 54 of a second distribution box 50. The outputs 51,52,53 and 54 of the distribution box 50 are internally through-connected to the inputs 55, 57, 58 and 59, respectively, of the distribution box 50. The inputs 55, ... 59 are through-connected via a second set of optical fibres to the respective wall sockets 20, ... 24. The common terminal unit 3 further comprises a third distribution box 60, whose outputs 66, ... 70 are through-connected through a third set of optical fibres to the respective wall sockets 20, ... 24. The inputs 61, ... 65 are coupled through a third power splitter 6 to an optical filter 7, which may take the form of a mirror and the inputs 61, ... 65 are further internally through-connected to the outputs 66, ... 70 of the distribution box 60.

In the embodiment shown in FIG. 1, each optical wall socket is connected through three fibres to the common terminal unit 3. One fibre is for the forward signals, one for the return signals and one for the intercommunication signals. It is now possible to give the first set of optical fibres for the forward signals and the third set of optical fibres for the intercommunication signals a larger diameter and a larger numerical aperture than the second set of optical fibres. The first and third sets of optical fibres may be given, for example, a diameter of 100 μm and a numerical aperture of 0.30. This results in the losses at welding areas and connection points being drastically reduced. A large number of wall sockets may be provided throughout the subscriber's premises. A possible distribution in a house is, for example, four in the living-room and two in each of three bed-rooms. Only a part of an optical wall socket will be connected to an apparatus. Incidental displacements are possible simply by connecting the relevant cables of apparatus to other wall sockets and further by establishing the correct through-connections in the distribution boxes 40, 50 and 60. Since the intercommunication now takes place through separate fibres, the choice of wave-lengths for the intercommunication signals is independent of the wave-lengths of the forward and return signals. The wave-lengths used for the forward and return signals can now also be used for the intercommunication signals.

In the embodiment shown in FIG. 2, the manner in which a terminal II comprising a telephone can be constructed is indicated. The optical signal from the wall socket 22 is conducted through an optical fibre 83 to an optical band-pass filter 72, from which an optical signal having a wave-length of, for example 1290 nm is selected and is converted by an optical-to-electrical converter 73 into an electrical signal. This electrical signal is converted by means of a digital-to-analogue converter 74 into an analogue electrical signal which is supplied to a telephone set 75. An electrical signal originating from the subscriber is converted by an analogue-to-digital converter 76 into a digital electrical signal, which is then converted in an electrical-to-optical converter 77 into a digital optical signal having a wave-length of, for example, 820 nm. This optical signal is radiated into the fibre 84 and conveyed to the distribution unit 1. FIG. 2 further illustrates how it is possible to communicate between the terminal II and, for example, a second telephone set which is present at another area in the house of the subscriber, whilst the connection of the telephone set 75 at the terminal II with another subscriber is maintained. For this purpose, the telephone set 75 is further connected through a digital-to-analogue converter 79 and an optical-to-electrical converter 78 to a power splitter 82 and through an analogue-to-digital converter 80 and an electrical-to-optical converter 81 to the power splitter 82. The power splitter 82 is connected through a fibre 85 to the wall socket 22. The core diameter and the numerical aperture of the fibres 83, 85, 87, 88 and 89 are chosen to be larger than the core diameter and the numerical aperture of the fibre 84, as a result of which coupling losses are considerably reduced. The power splitter 82 may be omitted if the fibres 88 and 89 are each connected to a separate connection contact of the wall socket 22. The wall socket consequently would then have four connection contacts instead of three. The power splitter 6 in combination with the optical filter of the third distribution box (60) may be replaced, for example, by a star coupling as described in IEEE-Transactions on Communication, Vol. Com-26, No. 7, July 1978, p. 985, FIG. 6.

When a monowire connection is used between the outputs 66, . . . 70 of the third distribution box 60, the combination of, for example, the power splitter 6 and the optical filter 71 may be replaced by a reflective star coupling of the kind shown in FIG. 5 of the aforementioned article.

The embodiment of FIG. 3, shows a possible construction for a common terminal unit at a subscriber's premises when a single optical fibre is present for transmission in both directions between the central unit 1 and the subscriber's premises. The optical fibre 2 for forward and return transmission is coupled in this case through an optical filter 72 to the power splitter 6. The optical fibre 2 is further coupled through the optical filter 72 and a fibre 90 to the power splitter 4. The core diameter and the numerical aperture of the fibre 90 are then chosen to be larger than the core diameter and the numerical aperture of the fibre 2. The further construction of the common terminal unit 3 is the same as that of the common terminal unit of the embodiment shown in FIG. 1. The optical filter 72 may be an interference filter as described in "IEEE Transactions on Communications", Vol. Com-26, No. 7, July 1978, p. 1083. Such a filter transmits a part of the spectrum and reflects the other part. For example, signals having wave-lengths >1100 nm are chosen for the forward transmission and signals having wave-lengths <1100 nm are chosen for the return transmission.

A power splitter which may be used in the distribution system shown in FIGS. 1 and 3 is known, for example, from "Electronic Letters", Vol. 15, Nov. 8, 1979, No. 23, p. 757–759. As wall sockets, normal connectors for optical fibres may be used, which are suitable for mounting on the wall or on any other suitable surfaces in the subscriber's premises. This also applies to the optical connections in the distribution boxes 40, 50 and 60.

FIG. 4 illustrates how outputs 91, . . . 99 of the third distribution box 60 can be subdivided into two or more groups. The outputs 91, 93 and 94 are coupled through a power splitter 102 to an optical filter 103 and form part of a first intercommunication group.

The outputs 96, 98 and 99 are coupled through a power splitter 101 to an optical filter 104 and form part of a second intercommunication group. The outputs 92 and 95 are directly connected to each other through fibres. In this manner, for example, a baby's room monitoring system or a sound amplifier may be connected to the wall sockets which are connected to these outputs.

What is claimed is:

1. A distribution system for a local fibre network comprising a distribution unit which is connected through one or more optical transmission fibres to a number of subscriber's premises, each subscriber's premises being provided with a common terminal unit, which has at least one input, the input being connected through at least a first power splitter to a first distribution box, outputs of the first distribution box being connected through a first network of optical fibres to respective optical sockets, on output of the terminal unit being connected through a second power splitter to a second distribution box, inputs of the second distribution box being connected through a second set of optical fibres to said sockets, the numerical aperture on the optical axis and the core diameter of the first set of optical fibres and of optical fibres present between the inputs of the first distribution box and the first power splitter being larger than the numerical aperture and the core diameter of the second set of optical fibres of the distribution system, characterized in that the terminal unit comprises a third distribution box, outputs of the third distribution box being connected through a third set of fibres to said sockets, inputs of the third distribution box being connected through a third power splitter to an optical filter.

2. A distribution system as claimed in claim 1, characterized in that the numerical aperture on the optical axis and the core diameter of the third set of fibres and the optical fibres present between the inputs of the third distribution box and the optical filter are larger than the numerical aperture and the core diameter of the second set of fibres.

3. A distribution system as claimed in claim 1 or 2, characterized in that the optical filter comprises a mirror.

4. A distribution system as claim in claim 3, characterized in that the outputs of the third distribution box are subdivided into groups, each group being connected through a power splitter to an optical filter.

5. A distribution system as claimed in claim 4, characterized in that at least two outputs of the third distribution box are connected directly to each other through fibres.

* * * * *